US010630549B2

(12) United States Patent
Leung et al.

(10) Patent No.: US 10,630,549 B2
(45) Date of Patent: Apr. 21, 2020

(54) METHODS AND SYSTEMS FOR CONFIGURING SYSTEM

(71) Applicant: PISMO LABS TECHNOLOGY LIMITED, Hong Kong (HK)

(72) Inventors: Wan Chun Leung, New Territories (HK); Ho Ming Chan, Quarry Bay (HK)

(73) Assignee: PISMO LABS TECHNOLOGY LIMITED, Kowloon (HK)

( * ) Notice: Subject to any disclaimer, the term of this patent is extended or adjusted under 35 U.S.C. 154(b) by 0 days.

(21) Appl. No.: 16/391,245

(22) Filed: Apr. 22, 2019

(65) Prior Publication Data

US 2019/0253317 A1 Aug. 15, 2019

Related U.S. Application Data

(63) Continuation of application No. 15/118,889, filed as application No. PCT/IB2015/052869 on Apr. 20, 2015, now Pat. No. 10,270,656.

(51) Int. Cl.
*H04L 12/24* (2006.01)
*H04W 76/11* (2018.01)
(Continued)

(52) U.S. Cl.
CPC ....... *H04L 41/0846* (2013.01); *H04B 5/0031* (2013.01); *H04L 12/4641* (2013.01);
(Continued)

(58) Field of Classification Search
CPC ..... H04L 12/00–2836; H04L 41/00–50; H04L 67/00–34; H04W 4/00–80;
(Continued)

(56) References Cited

U.S. PATENT DOCUMENTS 6,367,014 B1 * 4/2002 Proust .................. G06Q 20/341
713/182
2003/0214970 A1 11/2003 Pimentel
(Continued)

FOREIGN PATENT DOCUMENTS

| CN | 101399846 A | 4/2009 |
| CN | 101772053 A | 7/2010 |

(Continued)

OTHER PUBLICATIONS

Speedfusion: Best Practice How to get the most out of SpeedFusion VPN bonding, Apr. 2013, pp. 1-11 (Year: 2013).*
(Continued)

*Primary Examiner* — Clayton R Williams
(74) *Attorney, Agent, or Firm* — Hershkovitz & Associates, PLLC; Abe Hershkovitz

(57) ABSTRACT

The present invention discloses methods and systems for configuring a second system. The system of the present invention determines at least one configuration and the identity information of the second system. The at least one configuration is then sent to the second system. The second system is configured with the at least one configuration. The at least one configuration can be sent through an SMS message, a USB modem plugged in the second system, or NFC. Additionally, the at least one configuration may comprise an APN. The at least one configuration may also be used to configure the second system to establish one or more VPN connections.

18 Claims, 9 Drawing Sheets

(51) Int. Cl.
*H04W 4/80* (2018.01)
*H04B 5/00* (2006.01)
*H04L 12/46* (2006.01)
*H04L 29/08* (2006.01)
*H04W 48/16* (2009.01)
*H04W 4/14* (2009.01)
*H04W 24/02* (2009.01)

(52) U.S. Cl.
CPC ...... *H04L 41/0246* (2013.01); *H04L 41/0803* (2013.01); *H04L 67/34* (2013.01); *H04W 4/14* (2013.01); *H04W 4/80* (2018.02); *H04W 48/16* (2013.01); *H04W 76/11* (2018.02); *H04L 41/28* (2013.01); *H04W 24/02* (2013.01)

(58) Field of Classification Search
CPC ..... H04W 48/00–16; H04W 76/00–16; H04W 24/00–02; H04B 5/0031
See application file for complete search history.

(56) References Cited

U.S. PATENT DOCUMENTS

| | | | |
|---|---|---|---|
| 2008/0101391 | A1 | 5/2008 | Au et al. |
| 2009/0088187 | A1 | 4/2009 | Krause et al. |
| 2009/0158148 | A1 | 6/2009 | Vellanki |
| 2010/0214929 | A1 | 8/2010 | Ljung |
| 2010/0279733 | A1 | 11/2010 | Karsten |
| 2011/0177811 | A1 | 7/2011 | Heckman |
| 2012/0096540 | A1 | 4/2012 | Hilgenkamp et al. |
| 2012/0155325 | A1 | 6/2012 | Eichen |
| 2013/0297933 | A1* | 11/2013 | Fiducia ............... H04L 63/0853 713/156 |
| 2014/0127992 | A1 | 5/2014 | Kuscher |
| 2014/0269930 | A1* | 9/2014 | Robinson ........... H04N 21/2365 375/240.24 |
| 2014/0274014 | A1* | 9/2014 | Dodla .................. H04B 5/0031 455/418 |
| 2015/0105059 | A1* | 4/2015 | Lamberton ........... H04L 63/102 455/418 |
| 2015/0133136 | A1 | 5/2015 | De Pasquale |

FOREIGN PATENT DOCUMENTS

| | | |
|---|---|---|
| EP | 2549783 A1 | 1/2013 |
| EP | 2721849 A1 | 4/2014 |
| WO | 2011039496 A1 | 4/2011 |
| WO | 2012172388 A1 | 12/2012 |

OTHER PUBLICATIONS

English language Abstract of CN 101399846 A (Apr. 1, 2009).
Search Report in Chinese Patent Application No. 201580012402.6, dated Dec. 25, 2018.
Office Action in Chinese Patent Application No. 201580012402.6, dated Jan. 3, 2019.
Combined Search and Examination Report in United Kingdom Patent Application No. GB1407199.7, dated Nov. 27, 2014.
SpeedFusion: Best Practices: How to get the most out of SpeedFusion VPN bonding, Apr. 2013, pp. 1-11 (Year: 2013).
International Search Report in International Application No. PCT/182015/052869, dated Jul. 30, 2015.
Written Opinion of the international Searching Authority in International Application No. PCT/182015/052869, dated Jul. 30, 2015.
English language Abstract of CN 101772053 A (Jul. 7, 2010).

* cited by examiner

METHODS AND SYSTEMS FOR CONFIGURING SYSTEM

RELATED APPLICATIONS

The present application is a Continuation application which claims the benefits of and is based on U.S. application Ser. No. 15/118,889 filed on Aug. 14, 2016, which is a National Stage Application and further claims the benefits of and is based on International Application No. PCT/IB2015/052869 filed on Apr. 20, 2015, the disclosures of which are hereby incorporated by specific reference thereto.

TECHNICAL FIELD

The present invention relates in general to the field of computer networks. More particularly, the present invention relates to methods and systems in which a first system configures a second system. The first system determines at least one configuration and the identity information of the second system, and then sends the at least one configuration to the second system.

BACKGROUND ART

Network equipment, such as router, VPN router, hub, server and other network enabled devices, may not be able to communicate through Internet Protocol (IP) if configuration of the network equipment is incorrect. As some of the network equipment is able to execute commands received through a SMS message, the commands can be used to configure and manage the network equipment. It is also common for network equipment to report errors and status to a management application running remotely through SMS messages. It is also well known to those skilled in the art that mobile network operators have been using Over-The-Air (OTA) to update or change data in smart cards (subscriber identity module (SIM) card or Universal Integrated Circuit Card (UICC)), without having to reissue the cards. OTA enables a mobile network operator to introduce new services or to modify content of smart cards in a rapid and cost-effective way. In one example, it has been demonstrated that a mobile phone's email account setting can be configured via SMS.

However, network equipment is usually identified with hostname or serial number. Therefore, a network administrator needs to manually record the phone number associated with the SIM card which is embedded with the network equipment. Also, the network administrator needs to manually send out SMS messages to configure the network equipment in order to make the network equipment reachable through IP. When there is a large number of network equipment to be configured through SMS, the management issues could become a time consuming task for the network administrator. Furthermore, if the network equipment is not embedded with interface to receive SMS message, the network equipment cannot be configured directly through SMS message. The present invention provides methods and systems to reduce the burden on a network administrator for configuring network equipment, particularly when the network equipment does not have a valid Internet Protocol (IP) address for receiving configurations.

DISCLOSURE OF INVENTION

Summary

The present invention discloses methods and a first system for configuring a second system. The steps of configuring include determining at least one configuration, determining identity information of the second system, and sending the at least one configuration to the second system. For example, configurations are sent to the second system through a Short Message Service (SMS message). The second system may have an embedded or external cellular modem capable of receiving a SMS message.

According to one of the embodiments, the at least one configuration corresponds to a request received by the first system. The request comprises the identity information of the second system and may be received from the second system. For example, the second system sends its serial number using a request SMS messages to a pre-configured mobile number when it first starts up and then the first system sends configurations to the first system using a configuration SMS messages after receiving the serial number from the second system. The pre-configured mobile number may correspond to the first system.

According to one of the embodiments, the second system is configured with the at least one configuration sent by the first system.

According to one of the embodiments, the at least one configuration comprises an Access Point Name (APN). The APN may be used by the second system to connect to the Internet.

According to one of the embodiments of the present invention, the at least one configuration is used to configure the second system to establish one or more Virtual Private Network (VPN) connections. The at least one configuration may also be used to configure the second system to combine the one or more VPN connections to form an aggregated VPN connection.

According to one of the embodiments, the at least one configuration is sent to at least one other system. For example the second system and the at least one other system needs to be configured with the same configuration, and hence the at least one configuration is sent to the second system and the at least one other system.

According to one of the embodiments of the present invention, the at least one configuration include settings for configuring IP address, Domain Name System (DNS), Dynamic Host Configuration Protocol (DHCP), drop-in mode, VPN bonding, etc.

According to one of the embodiments, the at least one configuration is sent through a Universal Serial Bus (USB) modem coupled to the second system. According to one of the embodiments, the at least one configuration is sent through Near Field Communication (NFC). According to one of the embodiments, the at least one configuration is sent using a Multimedia Messaging Service (MMS) message, Bluetooth, Infrared (IR), etc.

According to one of the embodiments of the present invention, the first system sends the at least configurations to the second system only after a confirmation is received from a network administrator.

According to one of the embodiments of the present invention, when the second system has a plurality of cellular modems, the first system sends the at least one configuration to one of the plurality of cellular modems. In one variant, the same at least one configuration is sent to at least two of the plurality of cellular modems. In one variant, the configuration is broken down and sent to at least two of the plurality of cellular modems.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term computer-readable medium, main memory, or secondary storage, as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. An wireless access network may be implemented using infra-red, High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, WiBRO, Evolution-DataOptimized (EV-DO); Digital Enhanced Cordless Telecommunications (DECT); Digital AMPS (IS-136/TDMA); Integrated Digital Enhanced (iDEN) or any other wireless technologies.

A cellular modem is capable of communicating with one or more cellular networks. A cellular modem can be an embedded cellular modem or an external cellular modem. Cellular modems connect to cellular networks to provide cellular communication. For example, a cellular network may be operated by Verizon, AT&T, China Mobile, Vodafone, or the like. A cellular network can also be a mobile virtual network operator (MVNO) or mobile other licensed operator (MOLO) that provides a wireless communications services but does not own the wireless or cellular network infrastructure over which the MVNO provides services to its customers.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, local area network (LAN), metropolitan area network (MAN), wide area network (WAN), the PSTN, a satellite communication system, a cable transmission system, and/or the like.

FIG. 1A illustrates a block diagram of a system according to various embodiments of the present invention. System 101 can be a network node or network host that provides network functionalities or have networking capabilities respectively. For example, system 101 can be a router, a hub, a gateway, an IEEE 802.11 access point, a database server, a web server, a virtualized router, a laptop, a computer, a smart-phone, a tablet, etc. System 101 comprises processing unit 104, main memory 106, secondary storage 105, system bus 107, network interfaces 102, and cellular modems 103.

There is no limitation as to how many network interface 102 that system 101 can have. System 101 can have no network interface, one or more network interfaces. When system 101 has no network interface, it communicates through cellular modems 103. In one variant, network interfaces 102 are also capable of being used for cellular communications if it has such capabilities built-in or if it is connected to an external cellular modem.

Viewing in conjunction with FIG. 1C, system 101 has access to at least one cellular modem, such as cellular modem 103, for connecting to cellular network, such as cellular network 122. Cellular modems 103a and 103b can be implemented using an embedded cellular modem, an internal cellular modem or an external cellular modem. For example, cellular modem 103a or 103b can be Universal Serial Bus (USB) based cellular modem. In one variant, cellular modem 103a or 103b is connected to a network interface, such as network interface 102, and hence system 101 has access to cellular modem 103 through network interface 102. In one variant, cellular modem 103a or 103b is connected to system 101 through a private or public interconnected network, such as interconnected networks 121, such that system 101 can send and receive SMS messages through cellular modem 103a or 103b.

In FIG. 1A, particular elements such as network interfaces 102 and cellular modems 103 are designated with a letter suffix ("a", "b", etc.). Particular elements will be referenced by their respective suffix 102a, 102b and 103a, 103b. References to the elements 102, 103 without their particular suffix will be understood to be a reference to the group collectively.

FIG. 1B illustrates a block diagram of a system, such as system 111, used for configuring another system according to various embodiments. System 111 comprises processing unit 114, main memory 116, secondary storage 115, system bus 117, network interface 112, and cellular modem 113. System 111 may be similar to system 101.

In one of the embodiments, dual Secure Digital (SD) or CompactFlash (CF) cards are used as the secondary storage 105 or 115 or part of the secondary storage 105 and 115.

FIG. 1C illustrates a network environment according to various embodiments of the present invention. System 101 is connected to cellular network 122 wirelessly through cellular modem 103a and 103b. System 111 is connected to cellular network 123 through cellular modem 113. Cellular networks 122 and 123 are connected to interconnected networks 121. Therefore, system 101 and system 111 may have internet connectivity by being connected to interconnected networks 121 through cellular networks 122 and 123 respectively. In one variant, system 111 and system 101 are connected to the same cellular network, such as cellular network 122. In one variant, system 101 connects to cellular network 122 through cellular modem 103a and to cellular network 123 through cellular modem 103b. In one variant, system 111 may be connected to interconnected networks 121 directly through network interface 112. Similarly, system 111 may be connected to interconnected networks 121 directly through network interface 102a and/or 102b. Interconnected networks 121 may be the Internet.

Receiving Configuration SMS Message.

FIG. 2 is a flowchart illustrating one of the embodiments of the present invention and should be viewed in conjunction with FIG. 1A. System 101 receives a configuration to configure itself. The configuration is received in a SMS message. For easier reading, the configuration received through a SMS message is referred to "configuration SMS message". The configuration SMS message may be sent by system 111. System 111 is capable of sending out configuration to configure another system, such as system 101. Upon receiving the configuration SMS message, system 101 is then able to create a configuration for the network equipment. At step 201, system 101 receives a configuration SMS message through one of cellular modems 103a and 103b. System 101 is not limited to only having two cellular modems, such that system 101 may have one or more cellular modems. The configuration SMS message received can be stored in main memory 106 or secondary storage 105. The configuration SMS message may be received in one or more parts depending on the size of a configuration in the configuration SMS message. When the configuration SMS message is received in more than one part, the more than one part is concatenated into one configuration SMS message at system 101 by processing unit 104. Preferably, the configuration SMS message is only stored temporarily as when all processes of the flowchart have been performed, storing the configuration SMS message may consume storage unnecessarily.

After the complete configuration SMS message is received, processing unit 104 validates the configuration SMS message according to the program instructions stored in main memory 106 or secondary storage 105 in step 202. The validation may include authentication and validating the integrity of the configuration SMS message and/or the content carried by the configuration SMS message. For example, in order to validate the content, the content is decrypted using a password. If the content can be decrypted by processing unit 104, the content is authenticated and it is determined that the content has not been tampered. In one variant, the format of the content is examined by processing unit 104 for integrity. Processing unit 104 determines whether the configuration SMS message arrived from a reliable source that is authorized to generate a configuration for system 101. The validation step serves at least two purposes. The first purpose is to ensure that the configuration SMS message has integrity. The second purpose is to ensure that the configuration SMS message is sent from an authorized source.

At step 203, a configuration is created by processing unit 104 substantially based on the content of the configuration SMS message. The content of the configuration SMS message is converted into the configuration, which can be in the form of machine readable program instructions or a configuration file. In one example, the configuration may be used to assign IP address(es) to one or more network interfaces and/or cellular modems of system 101. The configuration may also comprise Access Point Name (APN) string(s) corresponding to a cellular modem which is used by the cellular modem for setting up its Internet Protocol (IP) based connectivity.

At step 204, processing unit 104 then configures system 101 according to the configuration. The configuration may first be loaded into secondary storage 105 or main memory 106. Then processing unit 104 performs functions, such as initialization, establishing communications, health check, diagnostics, troubleshooting, and other functions. In one variant, processing unit 104 performs network functions based on the program instructions and the configuration. The network functions may include establishing a VPN connection, aggregating VPN connections, configuring Domain Name Service (DNS), configuring Dynamic DNS (DDNS), configuring DHCP, and configuring drop-in mode.

FIG. 4 is a flowchart illustrating another process carried out in a network node, such as system 101, for configuring the network node. The process starts at step 400. In step 401, a request is created by processing unit 104 for receiving configuration through SMS. One or more cellular modems or network interfaces of system 101 are selected for sending the request through SMS in step 402. For illustration purpose, cellular modem 103a is selected for sending the request. Mobile number corresponding to cellular modem 113 can be preconfigured in system 101 and stored in secondary storage 105. In step 403, a request SMS message containing the request is sent to system 111 through cellular modem 103a. The request may comprise the identity information of system 101 and the type of configuration being requested. For example, system 101 may request for configuration comprising APN information. The APN information can then be used to allow system 101 to connect to the Internet through cellular modem 103a. When the APN is received by system 101 through the configuration SMS message, system 101 can then use the APN for IP connectivity. Alternatively, system 101 may request configuration for establishing a VPN connection, aggregating VPN connections, configuring DNS, DHCP, or drop-in mode. After sending the request, system 101 waits for one or more configuration SMS messages. In step 404, processing unit 104 determines whether any configuration SMS message(s) is received. System 101 waits for configuration SMS message(s) until waiting time expired in step 405. If the configuration SMS message is not received before the waiting time expires, a new request is generated at step 401. The waiting time may be in the range of a few seconds to one minute. The waiting time is specified because if a configuration SMS message is not received within the waiting time, it is likely that the request SMS message containing the request was not transmitted successfully to system 111 or a configuration SMS message sent by system 111 did not reach system 101 successfully. Therefore the request is sent again when the waiting time expires. If configuration SMS message is received before the waiting time expires, processing unit 104 validates the configuration SMS message in step 406 and determines whether the configuration SMS message is valid. If the configuration SMS message is not valid, processing unit 104 generates another request in step 401. If the configuration SMS message is valid, processing unit 104 creates a configuration based, at least in part, on the content of the configuration SMS message in step 407. System 101 is then configured in step 408 according to the configuration created. Alternatively, processing unit 104 retrieves the configuration from the configuration SMS message and configures system 101 based on the configuration retrieved from the configuration SMS message.

In one of the embodiments of the present invention, a request for receiving a configuration SMS message from system 111 for configuring system 101 may be created by another device and then transmitted to system 111 by the another device. For example, system 101 is a router, and the user or administrator of system 101 uses a laptop for creating the request, and then sends the request to system 111 from the laptop. The request comprises identity information of system 101. In one variant, if configuration is being requested includes configurations for one or more specific network interfaces or cellular modems, the request further comprises identity information of the one or more network interfaces or cellular modems for which configuration is being requested. In one variant, system 101 may transmit a request to system 111 so that system 111 transmits configuration SMS message(s) to a plurality of devices which may or may not include system 101. The request comprises identity information of the plurality of devices which need to be configured.

The content of the configuration SMS message and the request SMS message can be in character string format, binary format, XML format, or any other format that can be used for SMS messages.

In one of the embodiments, system 101 sends a request SMS message directly to the mobile phone of a network administrator or user of system 111 for receiving a configuration SMS message. The network administrator then sends instructions to system 111 for sending configuration SMS message(s) according to the request sent by system 101.

In one of the embodiments of the present invention, system 101 sends a request SMS message to system 111 through a device or phone associated with system 111, such as an SMS server. For example, system 111 is a laptop or router that does not have SMS capabilities, i.e., system 111 does not have a SIM card inserted in cellular modem 113. The request SMS message is sent to the SMS server by system 101 through a cellular modem of system 101, and the SMS server then forwards the request to system 111 through interconnected networks 121, such as the Internet. The request SMS message comprises a request for receiving configuration at system 101. Similarly, system 111 sends configuration SMS messages to system 101 through the SMS server. System 111 first sends the configuration SMS message in the form of IP packets to the SMS server through the Internet, and the SMS server then forwards the configuration SMS message to system 101 through a cellular modem of system 101.

A configuration SMS message may be validated based on one or more conditions in steps 406 and 202. In one variant, processing unit 104 determines whether the configuration SMS message is complete, i.e. whether all parts of a configuration has been received yet. If it is determined that the configuration SMS message is not complete, system 101 waits for the remaining parts of the configuration SMS message, and invalidates the configuration SMS message if the remaining parts are not received within a predefined time period. In step 406, when the configuration SMS message is invalidated, the process starts again from step 401. If it is determined that the configuration SMS message is complete, the configuration SMS message is validated. In one variant, if the configuration SMS message is encrypted, processing unit 104 first determines whether the configuration SMS message is complete. If the configuration SMS message is complete, processing unit 104 then determines whether the configuration SMS message can be decrypted by processing unit 104. If the configuration SMS message is successfully decrypted, the configuration SMS message is validated. Otherwise, the configuration SMS message is invalidated. In another variant, if the configuration SMS message is successfully decrypted, processing unit 104 determines whether the phone number of the sender of the configuration SMS message matches a pre-configured phone number. If the phone number of the sender matches the pre-configured phone number, the configuration SMS message is validated. A successful decryption of the configuration SMS message can confirm that the configuration SMS message has integrity, not being tampered and is sent by system 111. The configuration SMS message may be encrypted by system 111 using a pre-shared key that has been already stored in system 101. Otherwise the configuration SMS message is invalidated.

According to a preferred embodiment, system 101 starts transmitting and/or receiving data through IP when system 101 is configured according to the configuration received through the configuration SMS message. Therefore, without receiving the configuration, system 101 may not be able to transmit and/or receive data. For example, system 101 does not have an IP address and cannot transmit and/or receive IP packets.

In one of the embodiments, system 101 does not transmit or receive data packets until system 101 is configured according to the configuration received through the configuration SMS message. This ensures that system 101 receives the most updated configuration before connecting to a network. As an incorrect configuration may affect a network adversely. For example, system 101 is originally configured to act as a DHCP server by the manufacturer of system 101. If system 101 is connected to a network without further configuration, system 101 will assign IP address to other hosts as system 101 acts as a DHCP server. In order to avoid this, the present invention allows the system 101 not to perform its functions until a configuration is received through configuration SMS message and processing unit 104 has configured system 101. The configuration, for example, includes instructions to configure system 101 to be a DHCP client, instead of a DHCP server. Then system 101 will not assign IP address to other hosts when it is connected to the network.

In another example, the configuration contains information to allow system 101 to establish one or more VPN connections with a remote network node. When system 101 is configured with the configuration, system 101 is then able to establish one or more VPN connection and then transmit and/or receive confidential information through the established one or more VPN connection. A VPN connection can be in the form of a tunnel, for example, using SSH tunnel techniques. There is no limitation that a VPN connection has to be a SSH tunnel. For example, a VPN connection can also be form using IPSec protocol.

In one variant, system 101 does not transmit or receive data packets until the VPN connection is established according to the configuration received through the configuration SMS message. The use of configuration SMS messages to configure the VPN connection reduces the burden of network administrator in configuring VPN connections manually. The configuration SMS messages enable system 101 to establish VPN connections and then communicate with an internal network securely.

For illustration purpose, system 101 receives a configuration SMS message from system 111 to establish a VPN connection with a remote network node. The configuration SMS message may be received in response to a request SMS message sent by system 101. It is also possible that the configuration SMS message is sent by system 111 without receiving a request SMS message from system 101. The configuration SMS message specifies the VPN technology to be used for establishing the VPN connection, such as IPSec, SpeedFusion, OpenVPN, SSH tunnel, etc. The configuration SMS message may further specify the identity information of a network interface or cellular modem of system 101, IP address of the remote network node, identity information of the remote network node, encryption standard, and optionally a shared key for connecting to the VPN through the VPN connection. If the remote network node has more than one network interfaces or cellular modems, the IP address of a specific network interface or cellular modem is also specified.

The remote network node may also be configured to establish a VPN connection with system 101 by system 111 through another configuration SMS message which specifies the IP address of a network interface or cellular modem of system 101, identity information of system 101, encryption standard and optionally the shared key.

When system 101 receives the configuration SMS message, processing unit 104 creates a configuration based on the configuration SMS message. For example, the configuration specifies IPSec as the VPN technology and network interface 102a through which system 101 establishes the VPN connection. The encryption standard is specified as 256-bit AES encryption and the shared key is "newyork". Therefore when system 101 is configured with the configuration, system 101 establishes a VPN connection with the remote network node through network interface 102a. The encryption standard used for data transmitted or received through the VPN connection is 256-bit AES encryption.

In one variant, the configuration SMS message may comprise configuration for aggregating a plurality of VPN connections established according to the configuration. The information to allow system 101 to establish a plurality of VPN connections, and the information to allow system 101 to aggregate the VPN connections may be in the same configuration or different configurations. The configuration for establishing a VPN connection and aggregating VPN connection may be in the same configuration SMS message or different configuration SMS messages. The benefits for having aggregated VPN connection include allowing system 101 to utilize an access connection accessible through network interface 102a and wireless communication connection accessible through cellular modem 103a.

For example, system 101 receives a first configuration SMS message to establish an aggregated VPN connection with a remote network node. For illustration purpose, a first configuration SMS message is sent by system 111 to configure system 101 to establish a first VPN connection with the remote network node using network interface 102a and to establish a second VPN connection with the remote network node using cellular modem 103a. The first configuration SMS message further provides information for system 101 to configure itself in order to aggregate the first VPN connection and the second VPN connection to form an aggregated VPN connection.

In one illustration, the first configuration SMS message is sent only for configuring system 101 to establish the first VPN connection, and a second configuration SMS message is sent for configuring system 101 to establish the second VPN connection, and a third configuration SMS message is sent for configuring system 101 to form an aggregated VPN connection by aggregated the first and second VPN connections.

In another illustration, the first configuration SMS message is sent for configuring system 101 to establish the first and second VPN connections, and a second configuration SMS message is sent for configuring system 101 to form an aggregated VPN connection by aggregating the first and second VPN connections.

The configuration SMS message comprises configuration for one or more cellular modems or network interfaces of system 101. For example, cellular modems 103a and 103b connect to different carriers and need to use different APNs for connecting to the Internet. In one variant, when the configuration SMS message comprises configuration for more than one cellular modem, the configuration SMS message comprises APNs for both cellular modems 103a and cellular modems 103b. The configuration SMS message also comprises information for identifying which APN is for which cellular modem. Alternatively, a first configuration SMS message is sent by system 111 comprising APN for cellular modem 103a, and a second configuration SMS message is sent by system 111 comprising APN for cellular modem 103b. The first and second configuration SMS message can be received by system 101 through the same or different cellular modems. The first and second configuration SMS message comprises identity information of cellular modem 103a and 103b respectively, such that processing unit 104 can identify which configuration SMS message is for which cellular modem.

According to one of the embodiments of the present invention, system 111 sends configuration in one or more configuration SMS messages to system 101 for configuring the APN and for configuring a VPN connection. For example, cellular modem 103a has not configured an APN, and hence cannot connect to the Internet. System 111 sends a first configuration SMS message to system 101 comprising an APN corresponding to a SIM card inserted in cellular modem 103a. The first configuration SMS message may sent by system 111 to system 101 in response to a request SMS messages sent by system 101 or may be sent on the own initiative of system 111. System 101 then uses the APN to have IP connectivity at cellular modem 103a. The first configuration SMS message further comprises configuration for system 101 to establish a VPN connection with a remote network node through cellular modem 103a. Since cellular modem 103a is now able to connect to the internet, system 101 is able to establish a VPN connection through cellular modem 103a. Alternatively, system 111 sends a second configuration SMS message to system 101 comprising the configuration for system 101 to establish a VPN connection with the remote network node through cellular modem 103a. Therefore system 101 first connects to the Internet through cellular modem 103a using the APN in the first configuration SMS message, and then establishes a VPN connection with the remote communication node through cellular modem 103a based on the configuration received from system 111 in the second configuration SMS message.

In one variant, system 111 first sends a configuration SMS message comprising the APN corresponding to the SIM card inserted in cellular modem 103a. System 101 is then able to have IP connectivity through cellular modem 103a using the APN. System 111 then sends a second configuration to system 101 using IP packets instead of SMS message, since system 101 has IP connectivity through cellular modem 103a. The second configuration is sent for system 101 to establish a VPN connection with a remote network node through cellular modem 103a. System 101 first connects to the Internet through cellular modem 103a using the APN, and then establishes a VPN connection with the remote communication node through cellular modem 103a based on the second configuration received from system 111 using IP packets.

In one variant, system 111 first sends a configuration SMS message comprising a first APN corresponding to the SIM card inserted in cellular modem 103a, and a second APN corresponding to a SIM card inserted in cellular modem 103b. Both cellular modems 103a and 103b then have IP connectivity using the first and second APNs respectively. System 111 then sends one or more configurations to system 101 for establishing a first VPN connection and a second VPN connection with a remote network node using cellular modems 103a and 103b respectively, and then aggregating the first and second VPN connections to form an aggregated VPN connection. The configurations for establishing and aggregating VPN connections may be sent using IP packets or configuration SMS messages.

The configurations or configuration SMS messages may or may not be sent in response to a request SMS message sent by system 101.

In this way system 101 can be configured to have IP connectivity and also establish VPN connections without the network administrator having to manually configure it. This makes it much more convenient for the network administrator to configure network nodes such as system 101.

Receiving multiple SMS messages when device is turned on.

According to one of the embodiments of the present invention, system 101 receives a plurality of configurations in a plurality of configuration SMS messages respectively. For example, when system 101 has not been powered up yet or system 101 is turned off, a first configuration SMS message comprising a first configuration is sent to system 101 by system 111. The network administrator may then decide to configure system 101 with a second configuration after the first configuration SMS message has already been sent to system 101. Therefore the network administrator sends instructions to system 111 for sending a second configuration SMS message comprising the second configuration to system 101 when system 101 has not been powered up, system 101 is still turned off or system 101 is not able to receive SMS messages. When system 101 is able to receive SMS messages later, two configuration SMS messages, namely the first configuration SMS message and the second configuration SMS message, are received by system 101. Processing unit 104 then disregards the first configuration SMS message and validates the second configuration SMS message because the second message is the most recent. Therefore processing unit 104 configures system 101 with the second configuration that was received in the second configuration SMS message.

According to one of the embodiments of the present invention, system 101 receives configurations in a plurality of configuration SMS messages through a plurality of cellular modems. For example, the size of a configuration is such that it needs to be sent using at least three configuration SMS messages. The configuration is first divided into three parts, and each part is then converted into a separate configuration SMS message. The three configuration SMS messages are sent to different cellular modems of system 101. For illustration purpose, a first configuration SMS message is sent to cellular modem 103a and a second part and a third configuration SMS message is sent to cellular modem 103b. The contents of the first, second and third configuration SMS messages are then combined at system 101 to retrieve the complete configuration. This may help reduce the time required to receive the complete configuration as cellular modems 103a and 103b can receive configuration SMS messages at the same time.

In one of the embodiments of the present invention, the same configuration SMS message is sent to both cellular modems 103a and 103b. The same configuration SMS message is sent to both cellular modems so that if sending through one of the cellular modems fails or is delayed, system 101 can receive the configuration SMS message through the other one of the cellular modems reliably and quickly.

Transmitting configuration SMS message.

FIG. 3 is a flowchart illustrating a process for transmitting a configuration SMS message according to one of the embodiments of the present invention and should be viewed in conjunction with FIG. 1A and FIG. 1B. System 111 is used for sending a configuration SMS message for configuring a network node, such as system 101. In step 301, processing unit 114 determines a configuration. In one variant, the configuration is retrieved from a server according to identity information of system 101. The identity information of system 101 may comprise the serial number of system 101, model number of system 101, or the like. Alternatively, a network administrator may enter the configuration in system 111 with corresponding identity information of system 101. The network administrator may enter configuration in system 111 locally or remotely through a web interface, an application programming interface (API), a command line interface or a console. In one variant, the network administrator enters part of the configuration in system 111, and a program running at processing unit 114 can complete the rest of the configuration, based on, at least in part, the part of the configuration entered by the network administrator. For example, the network administrator enters part of the configuration including the identity information of system 101 and serial number of a Subscriber Identity Module (SIM) card inserted in cellular modem 103a. The program running at processing unit 114 can then retrieve a corresponding APN from secondary storage 115 or a remote server and complete the rest of the configuration by inserting the corresponding APN in the configuration. This allows the configuration to be retrieved from secondary storage 115 automatically, hence making it easier for the network administrator to configure system 101.

In step 302, processing unit 114 determines one or more recipients for sending the configuration. The one or more recipients may be entered by the network administrator while entering the configuration in step 301. The one or more recipients may include the mobile number corresponding to one or more cellular modems of system 101. The one or more recipients may also include the mobile number corresponding to cellular modem(s) of more than one device. The more than one devices can be a network node or network host such as a router, a hub, a gateway, an IEEE 802.11 access point, a database server, a web server, a virtualized router, a laptop, a computer, a smart-phone, or a tablet. When the one or more recipients include the mobile number corresponding to cellular modem(s) of a plurality of devices, the plurality of devices similar to system 101 can be configured simultaneously or almost simultaneously by sending out configuration SMS messages to the plurality of devices. The plurality of devices are similar and will be configured with the same configuration. The plurality of devices may be similar with regard to carrier and data plan of SIM cards inserted in their respective cellular modems, or may be similar with regard to their model numbers. In one variant, a database is used for storing identity information of the one or more recipients and mobile number(s) corresponding to the identity information. The database may be in an external server, secondary storage 115, or main memory 116.

In step 303, processing unit 114 converts the configuration to configuration SMS message(s). Processing unit 114 may also encrypt the content in the configuration SMS message(s) so that the recipient(s) can authenticate the configuration SMS message(s) received.

The configuration SMS message may have one or more parts depending on the size of the configuration. For example, if the size of the configuration is such that it uses up more than 160 7-bit characters when converted to a configuration SMS message, the configuration SMS message then is divided in more than one part, as each part can only have up to 160 7-bit characters. Encrypting the content in the configuration SMS message(s) increases the length of the configuration SMS message(s). Therefore, in one variant, in order to reduce the length of the configuration SMS message(s), the configuration SMS message is compressed to form a compressed configuration SMS message. The configuration SMS message can be compressed using one of the various compression techniques such as Huffman Encoding, Lempel-Ziv-Welch (LZW) compression, deflate compression technique, or any other compression technique that can be used for compressing SMS messages. The step of compressing the configuration SMS message is optional.

The configuration SMS message(s) are then transmitted through cellular modem 113 to the one or more recipients including system 101, in step 304. If the configuration SMS message has more than one part, the configuration SMS message is transmitted to system 101 in more than one part. In one variant, the configuration SMS message is transmitted as soon as the configuration is entered by the network administrator. Alternatively, the configuration SMS message is transmitted to system 101 only when system 101 is turned on or powered up. For example, system 101 can send a notification to system 111 when it is turned on or powered up. Alternatively, a specific time is pre-configured by the network administrator, and the configuration SMS message(s) are transmitted at the specific time. Alternatively, the configuration SMS message is transmitted to system 101 only after receiving a request SMS message from system 101 comprising a request to receive configuration.

In one of the embodiments, the process of FIG. 3 starts after receiving an instruction from a network administrator for sending a configuration. The network administrator may send instructions to processing unit 114 through a web interface, an API, a command line interface or a console.

There are many methods for determining identity information of system 101. In one example, system 101 sends its identity information to system 111 through an SMS message, MMS message, Near Field Communication (NFC), Bluetooth, Wi-Fi direct or a USB modem. Alternatively, the network administrator may send the identity information to system 111 through a web interface, an API, a command line interface or a console. Alternatively, system 111 is capable of scanning a barcode or a QR code. Hence system 111 retrieves the identity information of system 101 by scanning the barcode or the QR code printed or labelled on the surface of system 101.

FIG. 5 is a flowchart illustrating how a configuration SMS message is transmitted according to one of the embodiments. In step 501, system 111 receives a request from a network node, such as system 101. The request is in the form of a request SMS message received through cellular modem 113. The request may comprise identity information of system 101 such as serial number, model number, etc. The request may further comprise identity information of SIM card(s) inserted in one or more cellular modems, such as carrier information and corresponding serial number(s) of the SIM card(s) inserted in the one or more cellular modems for which configuration is requested. The request may also include mobile number(s) associated with one or more cellular modems specified by system 101 for receiving the configuration. In one variant, the request is received from system 101 when system 101 first starts up. Alternatively, the request is received from system 101 when system 101 is ready to receive a configuration.

Configuration corresponding to system 101 is retrieved by processing unit 114 in step 502. In one variant, the configuration is retrieved from secondary storage 115 or main memory 116 based on, at least in part, the identity information of system 101. Alternatively, the configuration may be retrieved from an external server where the configuration is stored in a database with the identity information corresponding to the configuration.

The retrieved configuration is sent to a network administrator in a message in step 503 to confirm whether the configuration should be sent to system 101. The message comprising the configuration can be an email, an instant message, a SMS, a phone call, a message shown in a web page, a popup message at a web page, or other indicators that can be used to send the message to the network administrator. The network administrator is then prompted to confirm the configuration. Alternatively, a network administrator enters the configuration directly, and the network administrator's input is retrieved by processing unit 114 in step 502. In this case, step 503 and 504 may be omitted and step 505 is performed.

In step 504, processing unit 114 determines whether a confirmation is received from the network administrator. If the network administrator does not confirm that the configuration should be sent to system 101, the configuration is not transmitted to system 101 in step 506. If a confirmation is received from the network administrator, the configuration and authentication information is converted to one or more configuration SMS messages in step 505. The authentication information is included in the configuration SMS message so that system 101 can validate the configuration SMS message. The authentication information may include a digital certificate, a shared key, or encrypted information.

In step 507, one or more recipients of the configuration SMS message are determined. The one or more recipients may include the mobile number(s) corresponding to one or more cellular modems of system 101, such as cellular modems 103 of system 101 specified in the request. In one variant, the same configuration SMS message is transmitted to at least two cellular modems 103 of system 101. In another variant, the configuration SMS message is divided into at least two parts and transmitted in parts to at least two cellular modems 103 of system 101. At least one of the recipients of the configuration SMS message is system 101. The one or more recipients of the configuration SMS message may include devices that are similar to system 101 and may require the same configuration as system 101. Alternatively, the one or more recipients include the personal mobile number of the user of system 101 in order to inform the user that system 101 is being configured with the configuration in the configuration SMS message.

The configuration SMS message is then transmitted by system 111 through cellular modem 113 to the one or more recipients in step 508. In one variant, system 111 continues retransmitting the configuration SMS message until an acknowledgement is received from the recipients of the configuration SMS message.

In one variant, step 501 is omitted. A network administrator sends instruction to system 111 for sending configuration SMS message to system 101 as soon as system 101 is purchased. Therefore, the configuration SMS message is retrieved and sent to system 101 even before system 101 is turned on. Therefore, system 111 does not wait for receiving a request in step 501. When system 101 is turned on, one or both cellular modems 103 of system 101 are initialized, and the configuration SMS message is received.

In one variant, system 111 is notified when system 101 registers with a management software. As soon as system 101 registers with the management software, system 111 sends the configuration SMS message to system 101. The management software could be installed in a remote server or cloud infrastructure.

In one of the embodiments of the present invention, the configuration in the configuration SMS message comprises an APN. For example, system 101 sends a request SMS message to system 111 for receiving the APN corresponding to a SIM card inserted in cellular modem 103a. A network administrator may set the APN corresponding to the SIM card manually to system 111 through a webpage, an API, or a console and store the APN settings in a database locally or remotely. A configuration is created based on the APN settings. It is common knowledge that APN settings corresponding to a SIM card is provided by the Internet Service Provider (ISP) when the SIM card is purchased. In some cases, the ISP also provides a username and password that may be required for authenticating the SIM card while accessing the Internet. If the ISP also provides a username and password, the configuration also comprises the username and password. The request SMS message may comprise the identity information of the SIM card, such as the serial number corresponding to the SIM card. Based on the serial number corresponding to the SIM card, the configuration is retrieved from the database and then converted to a configuration SMS message. The configuration SMS message is then transmitted to system 101.

For illustration purposes, system 111 configures ten routers by sending configuration SMS messages. The routers have architecture similar to system 101 and cellular modems of all the routers have SIM cards provided by the same ISP. The SIM cards are also subscribed to the same data plan provided by the ISP. In this case, all ten routers may be able to get data connection using the same APN and the same username and password. The network administrator of system 111 then enters the APN, and optionally the username and password corresponding to the SIM cards through a webpage, an application programmable interface, or a console. Alternatively the APN, username and password is already stored in secondary storage 115. A configuration SMS message comprising the APN is created by system 111 and is then sent to all ten routers simultaneously or one by one. This significantly makes it more convenient for administrators to configure multiple devices without manually entering the configuration in each of the routers.

In another example, there are two APNs corresponding to an ISP. Using a first APN for accessing a network provided by the ISP gives a system a public IP address, whereas using a second APN for accessing the network provided by the ISP gives the system a private IP address. For illustration purpose only, a SIM card provided by Hong Kong CSL Ltd. is inserted in cellular modem 103a, and is subscribed to a data plan that provides public IP address to cellular modem 103a. Also, for illustration purpose, for a SIM card provided by Hong Kong CSL Ltd., the cost of subscribing to the data plan providing a public IP address is significantly higher than the cost subscribing to the data plan providing a private IP address. The APN required for accessing the Internet with a public IP address is "lte.public", while the APN required for accessing the Internet with a private IP address is "lte.internet". System 111 can configure system 101 to either have a public IP address or a private IP address by sending the corresponding APN to system 101 through a configuration SMS message. When system 111 sends a configuration SMS message to system 101 with the APN "lte.public", system 101 connects to the Internet through cellular modem 103a using a public IP address by providing the APN "lte.public" while connecting. Alternatively, when system 111 sends a configuration SMS message to system 101 with the APN "lte.internet", system 101 connects to the Internet through cellular modem 103a using a private IP address by providing the APN "lte.public" while connecting. However, if the SIM card is subscribed to a data plan that provides a private IP address, system 101 may not be able to use the APN "lte.public" to connect to the internet. In this case, system 111 sends a configuration SMS message to system 101 with the APN "lte.internet" which is then used by system 101 to connect to the internet through cellular mode 103a.

In another example, a SIM card is subscribed to a first data plan provided by a first ISP that allows tethering or a second data plan provided by the first ISP that does not allow tethering. The cost of subscribing to the first data plan is significantly higher than the cost subscribing to the second data plan. The SIM card is inserted in cellular modem 103b of system 101. A first APN can be used for connecting to the Internet and also allowing tethering if the SIM card is subscribed to the first data plan. A second APN can be used for connecting to the Internet if the SIM card is subscribed to the second data plan. For illustration purpose, the SIM card is subscribed to the second data plan. In this case, system 111 sends a configuration SMS message to system 101 with the second APN so that system 101 can use the second APN to connect to the Internet.

In another example, the SIM card is subscribed to the first data plan. System 111 sends a configuration SMS message to system 101 with the first APN to configure system 101 to connect to the Internet and allow tethering. Alternatively, system 111 may send a configuration SMS message to system 101 with the second APN to configure system 101 to connect to the Internet without allowing tethering.

It should be appreciated that the network administrator is able to choose which APN is used, and hence can control how system 101 is configured by system 111.

In one variant, priorities are assigned to the APNs corresponding to a particular ISP. For example, when the SIM card is subscribed to the first data plan which allows tethering, system 101 assigns a higher priority to the first APN and a lower priority to the second APN. A configuration SMS message comprising both the first APN and the second APN is sent to system 101 by system 111. System 101 first checks whether the APN with a higher priority, i.e. the first APN, can be used to connect to the Internet. If system 101 can successfully connect to the internet using the first APN, then the first APN is used. If system 101 cannot connect to the internet using the first APN, system 101 uses the APN with the lower priority, i.e., the second APN, to connect to the internet.

In one of the embodiments of the present invention, an APN database is created at system 111 for storing APNs according to their corresponding ISPs. The APN database may be stored locally in secondary storage 115 or remotely in a web server or an external storage unit. When a network administrator purchases SIM cards with a data plan from an ISP, the ISP provides a corresponding APN. The network administrator manually inputs the APN into the database. The database may be arranged according to the ISPs corresponding to the APN. The database may further be arranged according to the data plan corresponding to the APN, since the APN may be different for different data plans provided by the same ISP. When system 111 configures system 101, processing unit 114 looks up the database, and finds a suitable APN according to the ISP and data plan that a SIM card inserted in cellular modem 103a is subscribed to. System 111 then sends the suitable APN to system 101 through a configuration SMS message. In one variant, when a suitable APN is not found in the database, the network administrator manually inputs the APN corresponding to the SIM card, and the administrator's input is retrieved by system 111 and the APN is then sent to system 101 through a configuration SMS message.

In one of the embodiments, the APNs stored in the database include default APNs of most or all of the ISPs in a particular region or country where system 101 is used. If an APN other than the default APN is required to access the internet using a SIM card, the network administrator manually inputs the APN provided while purchasing the SIM card and sends the APN to system 101 from system 111.

In one of the embodiments, when a SIM card provided by a particular ISP is inserted in cellular modem 103a of system 101, system 111 sends multiple APNs corresponding to the particular ISP to system 101 through a configuration SMS message. Processing unit 104 determines, one by one at random, which one of the multiple APNs can be used to access the Internet. System 101 then uses one of the multiple APNs to access the Internet through cellular modem 103a.

In one of the embodiments of the present invention, system 111 is operated by the administrator of system 101. If system 101 is configured such that when a SMS message is received from anywhere other than system 111, the SMS message is forwarded to the administrator, so that the administrator is notified about the SMS message. The SMS message may be received by system 101 through cellular modem 103a or 103b. For example, the administrator can be notified about the SMS message by forwarding the SMS message to system 111 or any other mobile number belonging to the administrator. The SMS message can be forwarded through cellular modem 103a or 103b. Alternatively the administrator can be notified about the SMS message by sending a message comprising the contents of the SMS message to the administrator through network interface 102a and/or 102b. The message can be an email, a phone call, a message shown in a web-page, a popup message at a web-page, or other indicators that can be used to notify the administrator about the SMS message. For illustration purpose, a service provider of a SIM card inserted in cellular modem 103a provides a data-plan that allows the user to use data services at a fixed monthly rate for a specific number of minutes. When the specific number of minutes is over, the cost for data usage per minute becomes significantly high. The service provider sends a SMS message to system 101 through cellular modem 103a informing that the specific number of minutes has been exceeded. System 101 then notifies the administrator about the SMS message sent by the service provider, so that the administrator can take necessary steps. The administrator may want to stop using mobile data through cellular modem 103a to cut costs. Therefore it is critical that system 101 notifies the administrator about the SMS message.

In a preferred embodiment, system 111 is a mobile phone that is operated by a network administrator. System 101 is a router, a gateway, mobile phone, or the like. Preferably, it has a cellular modem through which it can receive configuration SMS messages.

In one of the embodiments of the present invention, system 101 may receive configuration using MMS, NFC, Bluetooth, Wi-Fi direct, a USB modem or any other wireless communication technology that can be used before system 101 has been configured for IP connectivity. Therefore the configuration can also be received without using configuration SMS messages.

FIG. 6 is a flowchart illustrating a process for configuring a network node according to one of the embodiments. A USB modem is coupled to the network node, such as system 101, through network interface 102a. When the USB modem is coupled to system 101 in step 601, system 101 may then be able to have IP connectivity, and thus sends identity information of system 101 to system 111 via the USB modem in step 602. The identity information may be a part of a request for receiving configuration from system 111. In step 603, configuration is received by system 101 through the USB modem. The configuration can be sent by system 111 and received by system 101 in one or more IP packets. The configuration received is then stored in a local storage of system 101, such as secondary storage 105, in step 604. Processing unit 104 configures system 101 according to the configuration in step 605. The USB modem may use Wi-Fi, 3G, LTE, 4G, or other wireless technologies for providing temporary IP connectivity to system 101. The configuration received may be embedded in one or more IP packets. For example, the configuration comprises an APN corresponding to a SIM card inserted in cellular modem 103a. When the system 101 receives the APN through the USB modem, system 101 is able to connect to the Internet using cellular modem 103a. Therefore, even after the USB modem is removed from network interface 102a, system 101 can still be connected to the Internet.

In one of the embodiments of the present invention, configuration is received by system 101 by using NFC technology. For example, mobile phone 111a and routers 101a-101d are NFC capable devices as shown in FIG. 7. Mobile phone 111a performs as system 111, and send configurations to routers 101a-101d. Routers 101a, 101b, 101c and 101d perform as system 101, and receive configurations from mobile phone 111a. For example, when mobile phone 111a is in close proximity to router 101a, router 101a may send its identity information to mobile phone 111a using NFC and mobile phone 111a then determines a configuration based on the identity information and sends the configuration to router 101a using NFC. Alternatively, mobile phone 111a sends the configuration based on an instruction from the network administrator, and does not wait until the identity information is received from router 101a. When a plurality of routers, such as routers 101a, 101b, 101c and 101d are stacked together, it may be very convenient for a network administrator to configure all of the plurality of routers with a same configuration by just sliding the mobile phone across the routers. This is beneficial especially when the routers are similar and need to be configured with the same configuration.

Although the present invention has been described through several exemplary embodiments, the invention is not limited to such embodiments. Any modification, equivalent replacement, or improvement made without departing from the spirit and principle of the present invention should fall within the scope of the present invention.

Figure 1A:
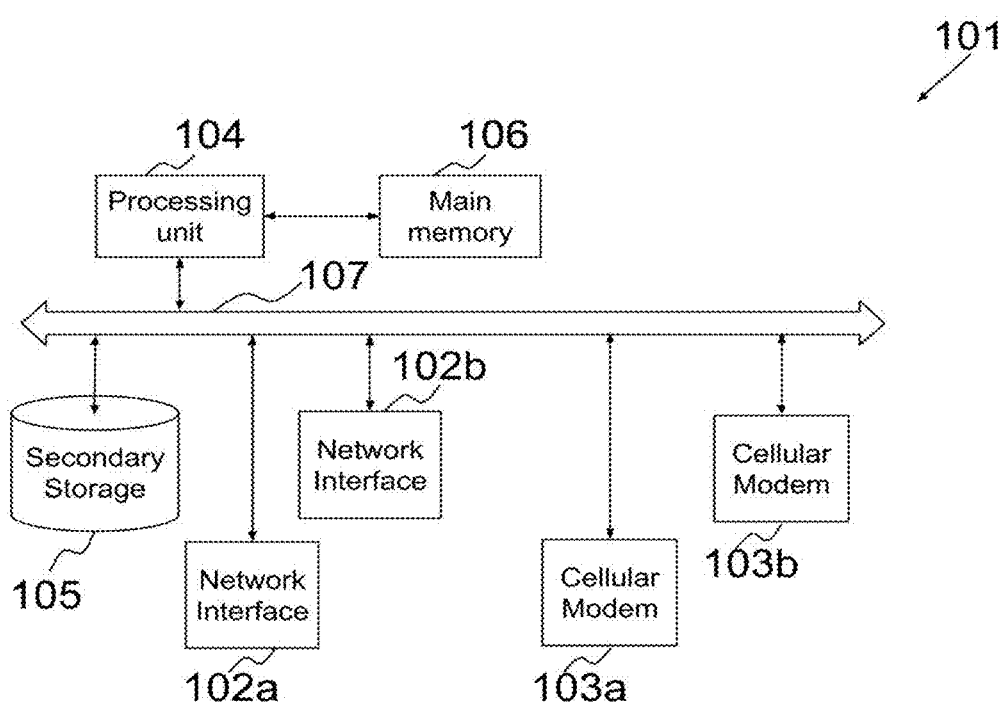
FIG. 1A illustrates a block diagram of a system according to various embodiments of the present invention.
Figure 1B:
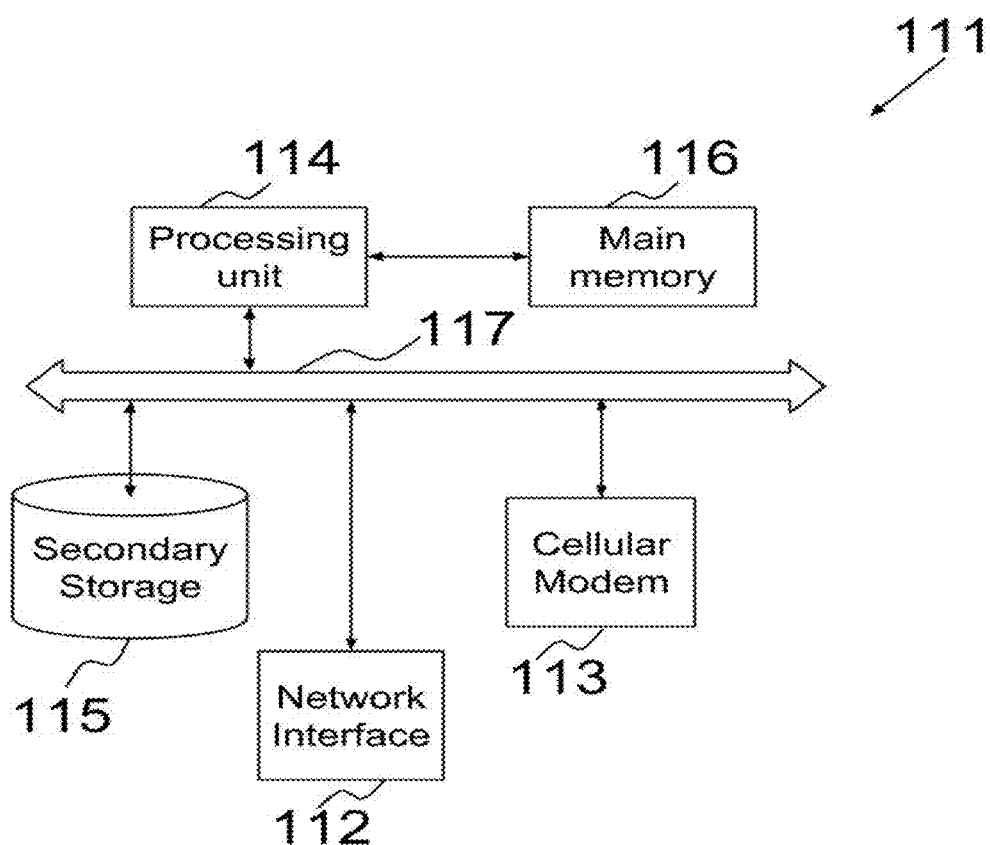
FIG. 1B illustrates a block diagram of a system used for configuring another system according to various embodiments of the present invention.
Figure 1C:
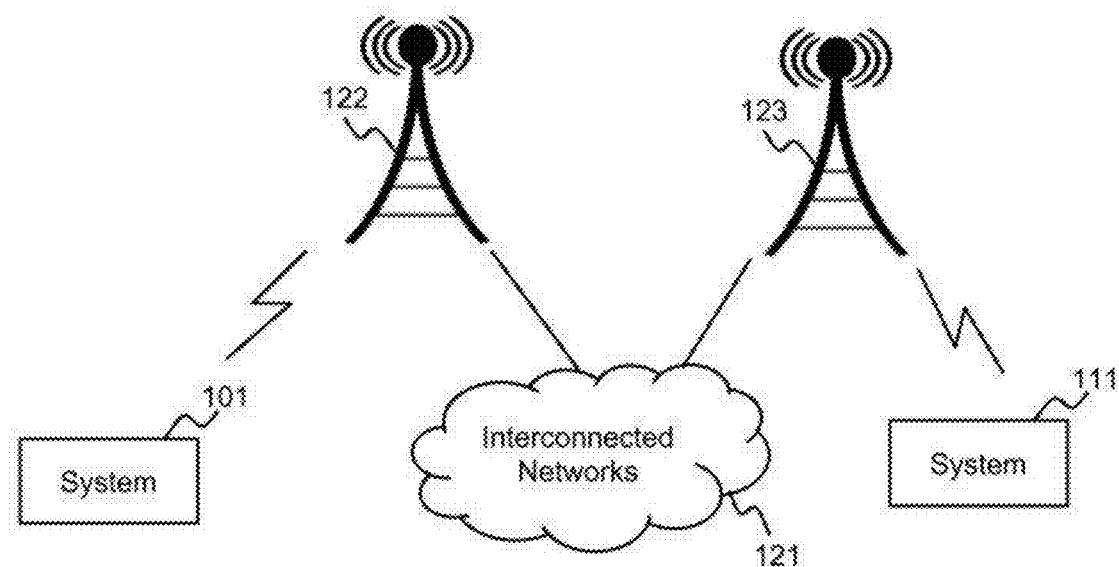
FIG. 1C illustrates a network environment according to various embodiments of the present invention.
Figure 2:
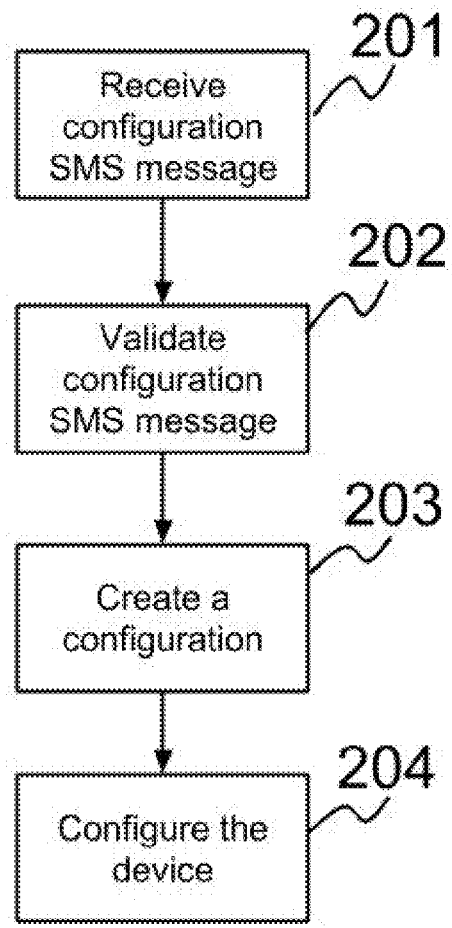
FIG. 2 is a flowchart illustrating a process according to one of the embodiments of the present invention.
Figure 3:
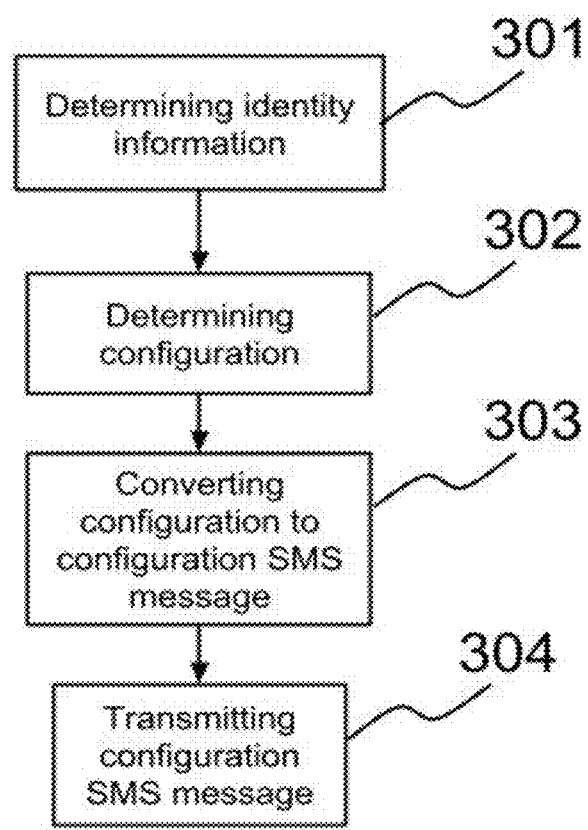
FIG. 3 is a flowchart illustrating a process for transmitting a configuration SMS message according to one of the embodiments of the present invention.
Figure 4:
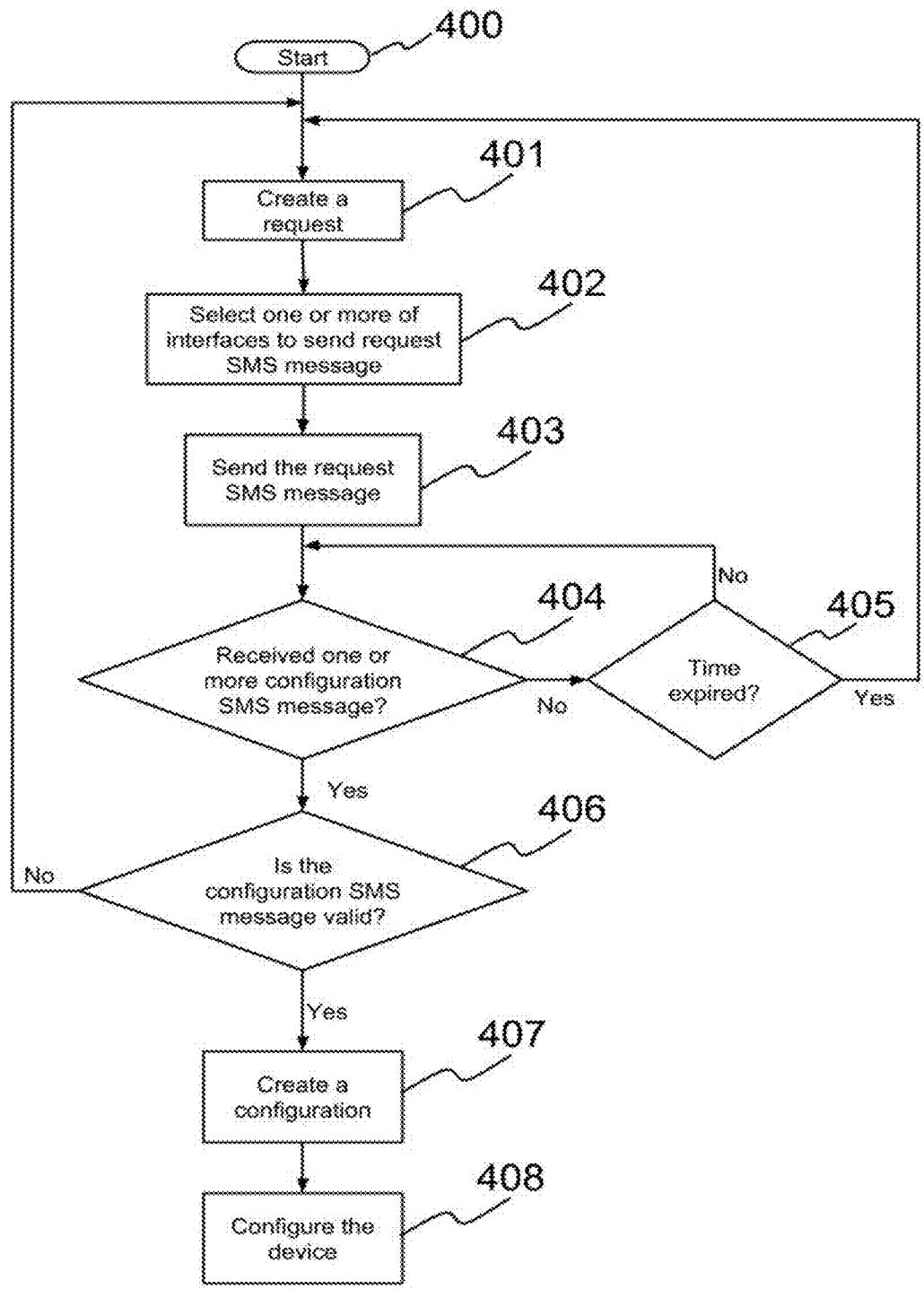
FIG. 4 is a flowchart illustrating a process for configuring a system according to one of the embodiments of the present invention.
Figure 5:
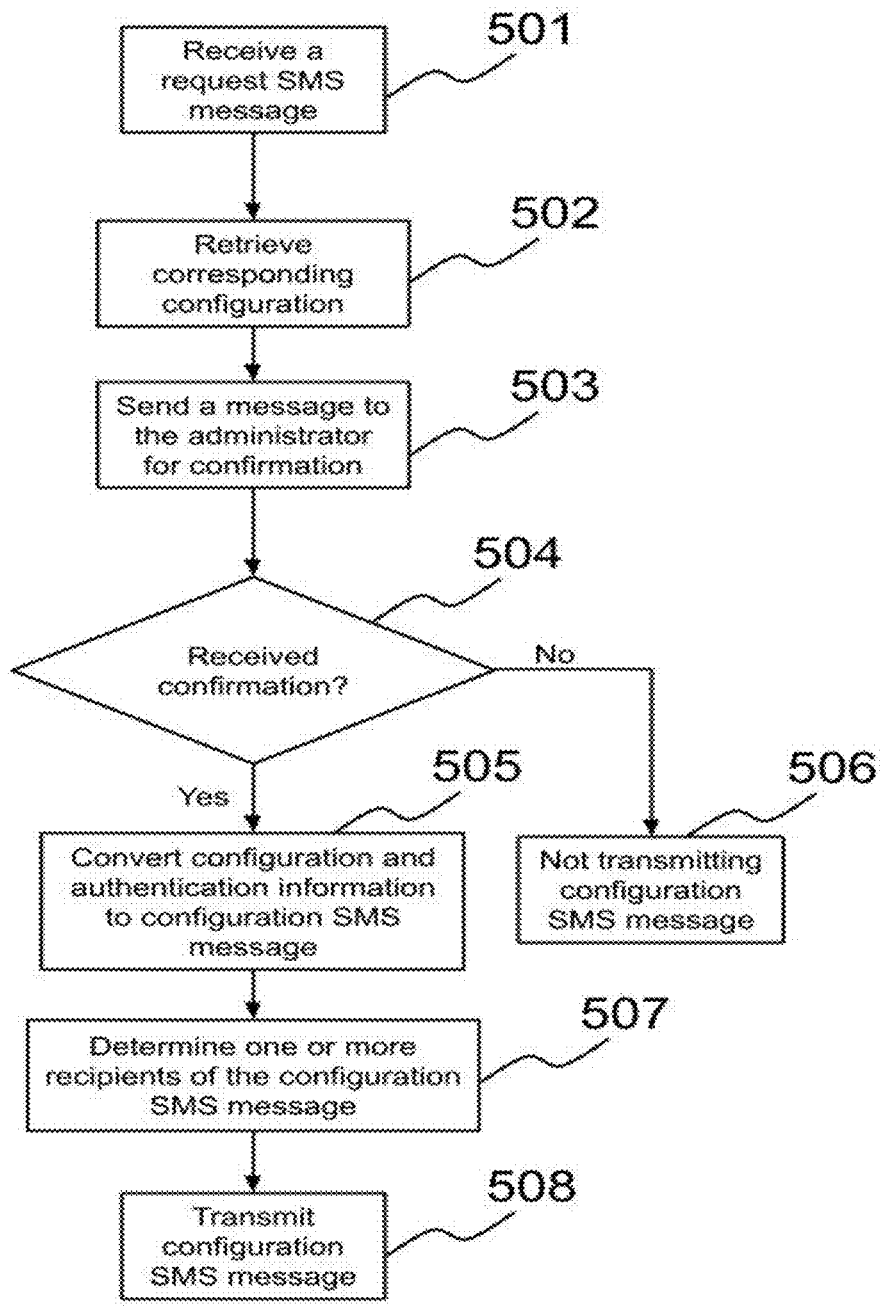
FIG. 5 is a flowchart illustrating a process for transmitting configuration SMS message according to one of the embodiments of the present invention.
Figure 6:
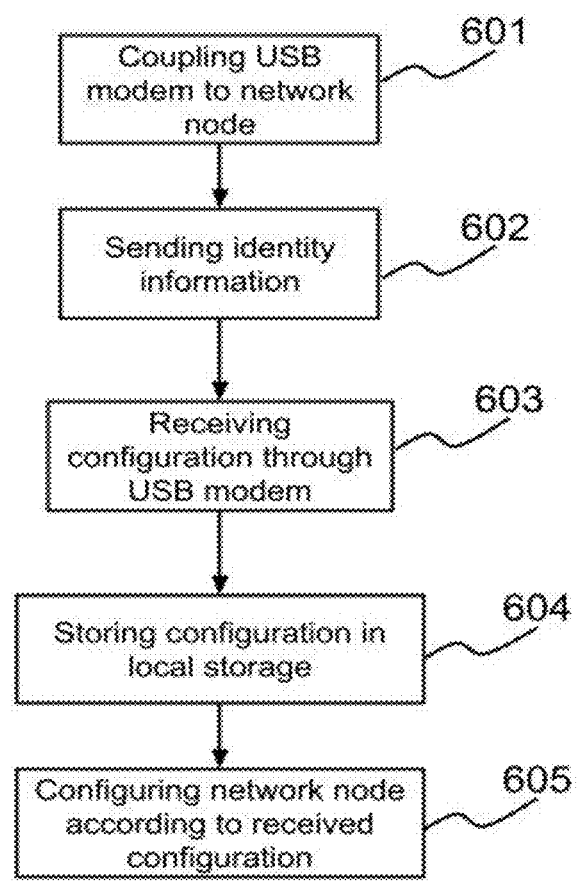
FIG. 6 is a flowchart illustrating a process for configuring a network node according to one of the embodiments of the present invention.
Figure 7:
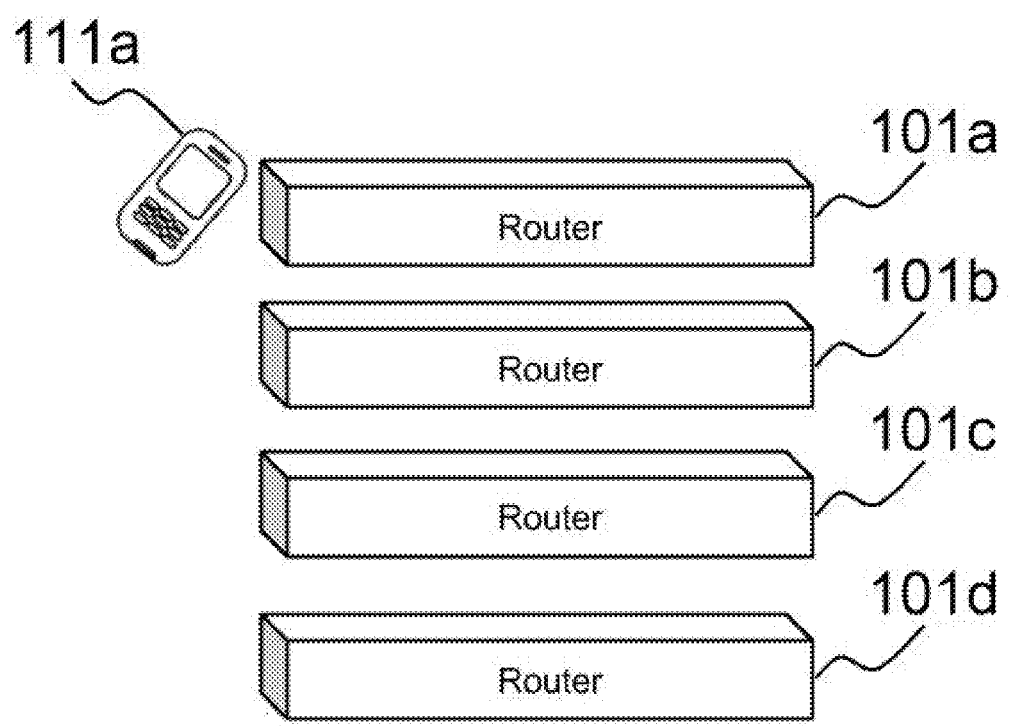
FIG. 7 is a diagram showing how one or more systems can be configured using NFC technology.

The invention claimed is:

1. A method performed by a first network node, wherein the first network node comprises a plurality of cellular modems, the method comprising:
   (a) at the first network node, receiving a first configuration through a wireless technology;
   (b) at the network node, validating the configuration;
   (c) at the network node, configuring the network node according to the configuration;
   (d) at the network node, performing network functions; and
   wherein the configuration is received from a server and is based on identity information of the first network node or at least one cellular modem of the plurality of cellular modems;
   wherein the configuration is received through a near field communication (NFC) technology from the server, wherein the server is a mobile device;
   wherein the mobile device is configured to communicate with a second network node through NFC;
   wherein the second network node is configured to receive the configuration from the mobile device through NFC; and
   wherein the second network node is positioned at a close proximity to the first network node.

2. The method of claim 1, wherein the network functions are performed through at least two cellular modems of the plurality of cellular modems.

3. The method of claim 1, wherein the configuration is received through a Short Message Service (SMS) through any of the plurality of cellular modems.

4. The method of claim 1, wherein the first network node is initially not connected to the Internet before receiving the configuration.

5. The method of claim 1, wherein the configuration is created by the server according to a request received by the server, and wherein the request received comprises the identity information of the network node or identity of one cellular modem of the plurality of cellular modems.

6. The method of claim 1, wherein the configuration includes configurations for one cellular modem of the plurality of cellular modems.

7. The method of claim 1, wherein the configuration is used to configure the network node to establish one or more Virtual Private Network (VPN) connections.

8. The method of claim 7, wherein the configuration is further used to configure the network node to combine one or more VPN connections to form an aggregated VPN connection.

9. The method of claim 1, wherein the configuration is used to configure the network node to connect to the Internet through at least two of the pluralities of the cellular modems.

10. A first network node, comprising:
    at least one network interface;
    a plurality of cellular modems; at least one processing unit;
    at least one main memory; and
    at least one secondary storage storing program instructions executable by the at least one processing unit for:
    (a) at the first network node, receiving a first configuration through a wireless technology;
    (b) at the network node; validating the configuration;
    (c) at the network node, configuring the network node according to the configuration;
    (d) at the network node; performing network functions; and
    wherein the configuration is received from a server and is based on identity information of the first network node or at least one cellular modem of the plurality of cellular modems;
    wherein the configuration is received through a near field communication (NFC) technology from the server, wherein the server is a mobile device;
    wherein the mobile device is configured to communicate with a second network node through NFC;
    wherein the second network node is configured to receive the configuration from the mobile device through NFC; and
    wherein the second network node is positioned at a close proximity to the first network node.

11. The first network node of claim 10, wherein the network functions are performed through at least two cellular modems of the plurality of cellular modems.

12. The first network node of claim 10, wherein the configuration is received through a Short Message Service (SMS) through any of the plurality of cellular modems.

13. The first network node of claim 10, wherein the first network node is initially not connected to the Internet before receiving the configuration.

14. The first network node of claim 10, wherein the configuration is created by the server according to a request received by the server, and wherein the request received comprises the identity information of the network node or identity of one cellular modem of the plurality of cellular modems.

15. The first network node of claim 10, wherein the configuration includes configurations for one cellular modem of the plurality of cellular modems.

16. The first network node of claim 10, wherein the configuration is used to configure the network node to establish one or more Virtual Private Network (VPN) connections.

17. The first network node of claim 16, wherein the configuration is further used to configure the network node to combine one or more VPN connections to form an aggregated VPN connection.

18. The first network node of claim 10, wherein the configuration is used to configure the network node to connect to the Internet through at least two of the pluralities of the cellular modems.

* * * * *